United States Patent

Meier et al.

[15] 3,697,645
[45] Oct. 10, 1972

[54] PURIFICATION OF ANTIBODIES

[72] Inventors: Eugene P. Meier, Edgewood; David E. Lenz, Bel Air; Ludwig A. Sternberger, Lutherville, all of Md.

[73] Assignee: The United States of America as represented by the Secretary of the Army

[22] Filed: April 28, 1971

[21] Appl. No.: 138,354

[52] U.S. Cl. .................................................. 424/85
[51] Int. Cl. .............................................. A61k 27/00
[58] Field of Search ......... 260/112 R; 424/85, 86, 87, 424/12

Primary Examiner—Richard L. Huff
Attorney—Harry M. Saragovitz, Edward J. Kelly, Herbert Berl and Jacob Ziegler

[57] ABSTRACT

Recovering the entire spectrum of all heterogeneous antibodies against a specific antigen or ligand by a process of adding an antigen to an immune serum forming a precipitate which is dissociated by a combination of addition of excess hapten and a non-specific dissociating compound and separating the dissociated heterogeneous antibodies from the antigen, hapten and dissociating compounds added.

11 Claims, No Drawings

PURIFICATION OF ANTIBODIES

DEDICATORY CLAUSE

The invention described herein may be manufactured, used, and licensed by or for the Government for governmental purposes without the payment to us of any royalty thereon.

This invention describes methods of obtaining a 100 percent recovery of a specific antibody population from antiserum for the prevention of the adverse effects of various antigens or ligands including poisons in mammals. The antibody population or fraction contains all the properties which can be associated with antibodies to an antigen or ligand, for example, nerve agents.

The object of this invention is to provide a purified antibody fraction containing the entire spectrum of all the heterogeneous antibodies against a specific antigen or ligand.

It is a further object of this invention of obtaining the total purified antibody population containing both the poorer binding and the stronger binding portions in the same proportions in which they have been present in the serum.

L. A. Sternberger et al, *J. Immuno.*, 65, 65, 1950, utilized the method of antibody separation employing alkali for dissociation of the immune precipitate and giving rise to a specific antibody population which contains only a portion of the total specific antibodies.

Antibodies have been dissociated from immunoabsorbents by interferring with either the coulombic or hydrogen bonding or hydrophobic bonding between antigen and antibody by separately using urea increased salt concentration (salt gradient), gradient), alkaline pH, acid pH, or an excess of antigen. S. F. Schlossman et al., *J. Exper. Med.*, 116, 535, 1962; De St Groth, *Ann. N. Y. Acad. Sci.*, 103, 609, 1963; M. E. Kaplin et al., *J. Exper. Med.*, 123, 106, 1966, have shown that the separation of specific antibodies from antigen utilizing immunoabsorbents results in a recovery of a portion of the specific antibody population, that is an antibody population which is not heterogeneous but rather possesses the poorer binding properties with the antigen while leaving on the absorbent an antibody population having the strongest binding properties.

The major deficiency of the prior art is that not a single method can recover the entire heterogeneous specific antibody population but there is present an antigen-antibody entity which prevents the total recovery of the desired antibodies.

As a result of the previous methods not achieving total recovery of all the antibody population to a specific antigen or ligand in the antiserum, we launched upon an investigation for total recovery of the antibody population with the entire spectrum of antibody being available to the investigator and final utilization by the clinician to counteract the deleterious effect of various chemical compounds.

Our inventive procedure permits for the first time recovering the total antibody fraction for a specific antigen or ligand by dissociating hydrophobic and coulombic bonds between antigen and antibody and utilizing a non-specific antibody such as antihemocyanin to remove extraneous antigen. The procedure is directed to the final rupturing of the bonding effect between antigen-antibody without any subsequent reassociation of the antigen with the antibody and then antibody separation thus giving rise to the whole antibody fraction to a specific moiety system, for example, aromatic acids, sugars, organophosphates, small peptides or neutral antigenic determinants. The process if applicable to various moieties containing not more than one antigenic valence.

The molecular moieties which contain not more than one antigenic valence are, for example, acids of arsanilic or benzoic containing the aromatic nucleus, saccharides of glucosamine or galactose, peptides of glycyclglycine, glycyltryrosine and other peptides containing up to 10 aminoacid residues, nucleotides containing up to seven nucleoside residues, neutral antigenic determinants of dinitrophenol, trinitrophenol, dinitrophenylysine, or dinitrophenylcaproate; organophosphates (G-Agents) 2-methylcyclohexyl methylphosphonofluoridate, isopropyl methylphosphonofluoridate, pinacolyl methylphosphonofluoridate, cyclohexyl methylphosphonofluoridate, and other organophosphate agents 0,0′-diethylpara-nitrophenylthiophosphate (parathion), insecticide, and p-nitrophenyl diethylphosphate (paraoxon), insecticide, nerve gas.

A general method for the preparation of antibodies to paraoxon, p-nitrophenyl diethylphosphate. An antigen prepared by diazotizing p-aminophenyldiethylphosphate to a carrier of hemocyanin is injected into a living animal; the carrier is a protein with a molecular weight in excess of 500,000, and an animal can be any animal used for immunization, i.e., rabbit. The animal serum is pooled and contains antibodies to p-aminophenyldiethylphosphate (hereinafter called anti-L) and several species of antibodies to hemocyanin (hereinafter called anti-M). Said antigen is added to the serum forming an immune precipitate which comprises the antigen, anti-L, and anti-M. The immune precipitate is resuspended on dissolution between 0° to 56° C. in the presence of 0.001 M to 10.0 M, an excess of p-aminophenyl diethylphosphate (hapten, hereinafter called L) and then adding a compound which causes dissolution of the precipitate forming a solution of free anti-L, free antigen, free L and fee anti-M; the time for dissociation can be instantaneous or may be pro longed for hours or days. The dissolution step may be carried out in one of several manners, for example acidic pH 1 to 4, alkaline pH 11 to 13, or salt addition of urea at 5M to 7M; an acid can be HCl and alkaline substance of alkali metal hydroxide of sodium or potassium; when employing salt addition technique dialysis against water or any buffer physiologic to the antibody is to be utilized. The solution containing the dissociated immune precipitate is neutralized to pH 7 to 7.6 thereby the free anti-M combines with the free antigen removing the antigen from solution by precipitation forming soluble complexes of anti-L with a part of the large excess of free L. The solution containing the soluble complexes is dialyzed against water or any buffer physiological to the anti-L, for example, 0.15 M NaCl and 0.01 M sodium phosphate, pH 7.4, described by Singer, S. J., et al., *J. Am. Chem. Soc.*, 82, 565 (1960), (1960), thus separating the purified anti-L from L, and anti-L can be stored at 1° C., frozen or lyophilized. The dialysis step can be replaced by gel filtration or other separation procedures of anti-L from L, hapten. The gel filtration process comprises placing the solution containing the soluble complexes on a column of cross-linked dextran and washing with saline or other physiological medium to the antibody thus separating the anti-L from the hapten, which is retained by the dextran, collecting the antibody fraction in the effluent from the dextran and the antibody fraction (average molecular weight of 150,000) is stored in the cold, frozen or lyophilized; the supernatant after neutralization to pH 7 to 7.6, cold storage and centrifugation comprises anti-L and hapten; the dextran possesses water regain of $10 \pm 1.0$ g/g dry gel), bed volume of 100,000, fractionation range of 1,000–100,000, particle size of 40 to 120 microns, for example, Sephadex, Superfine G–100.

The antigen used is reactive with two species of antibodies in the immune serum; only one species is intended for purification. The second species which is not intended to be purified reprecipitates the antigen upon completion of the procedure thus leaving pure antibody to the first species.

In addition to the procedures described in this specification, it is also an objective of this invention to employ methods for immunizing animals, preparing pooled serum, compounds containing the group of p-aminoaryl (p-aminophenyl) or diazoaryl and antigen described in the literature of the prior art, supra, for antibody separation; the use of other ligands than paraoxon and the mode of chemical conjugation for antigen preparation described by Pressman, D., and Sternberger, L. A., *J. Immunol.*, 66, 609, (1951); (1951); and Holtschmidt, U.S. Pat. No. 3,013,048, describing preparation for p-aminophenyl diethylphosphate by catalytic reduction of the nitro group in p-nitrophenyl diethylphosphate, paraoxon.

The production of antibodies against paraoxon, diethyl-p-nitrophenyl phosphate, in accordance with the procedure of Example 1.

EXAMPLE 1 a. The animals are imunized with an aqueous solution comprising the antigen of diazotized p-aminophenyldiethylphosphate coupled into hemocyanin. Each animal, rabbit, is injected with 10 mg/kg on a weekly basis over a period of 3 to 4 weeks. Subsequently each animal is bled on a weekly basis. The red cells are removed by gravity precipitation to prevent hemolysis and the collected serum pooled. Said serum (19 ml) is combined with 27.14 ml of a solution, 10 grams of diazotized p-aminophenyl diethylphosphate coupled into hemocyanin per liter of 0.15N saline. The solution which results is placed in the cold (4°C.) for 48 hours giving rise to a precipitate which is subsequently collected. The latter precipitate (1 to 3 grams) is resuspended in about 15 ml of 0.1 M p-aminophenyl-diethylphosphate HCl forming a suspension which is adjusted to pH 2.3 (HCl) with stirring at room temperature with complete dissolution of the precipitate forming a solution which is neutralized to approximately pH 7.4. An aqueous solution comprising 0.15 N in sodium acetate and 0.3 N in ammonium acetate is added to the solution at pH 7.4 in the ratio of 1 to 10 respectively and the resulting solution placed in he cold (4°C.) for about 4 days after which time any insoluble material is removed by centrifugation and the supernatant collected containing the antibodies to paraoxon. The supernatant is dialyzed against several changes of saline (0.15 N sodium chloride) containing 0.015 N sodium acetate and 0.03 N ammonium acetate. The final dialyzed material inside the semipermeable membrance containing all the antibodies in a liquid medium to diethyl-p-nitrophenyl phosphate, paraoxon. The liquid medium is stored at 1° C., quick frozen or lyophilized.

b. The method according to a, supra, was repeated with the exception of substituting for the conjugate of diazotized p-aminophenyldiethylphosphate coupled into hemocyanin an antigen selected from the group consisting of diazotized 0-(p-aminophenyl)-0'-pinacolyl methylphosphonate coupled into hemocyanin, diazotized p-aminobenzoic acid coupled into hemocyanin, diazotized glucosamine coupled into hemocyanin, diazotized glycylglycine coupled into hemocyanin, diazotized p-amino-m-nitrophenol coupled into hemocyanin, and diazotized 0,0'-diethyly-0''-p-aminophenylthiophosphate coupled into hemocyanin, substituting for the addition of 0.1 M p-aminophenyldiethylphosphate HCl in order for resuspension the corresponding compound selected from the group consisting 0-(p-aminophenyl)-0'-pinacolyl methylphosphonate· HCl, p-aminobenzoic acid · HCl, glucosamine · HCl, glycylglycine · HCl, p-amino-m-nitrophenl · HCl, and 0,0'-diethyl-0''-p-aminophenylthiophosphate · HCl and recovering the final dialyzed material of antibodies against compounds selected from the group consisting of 0-pinacolyl methylfluorophosphonate, benzoic acid, glucosamine, glycylglycine, dinitrophenol and 0,0'-diethyl-0''-p-nitrophenylthiophosphate. In the preparation of the antigen the carrier can be any protein having a molecular weight in excess 500,000, for example hemocyanin, ferritin, copolymers of proteins such as polyimmunogloblin or polyalbumin, such polymers being produced with tetraazotized benzidine, glutaraldehyde, bis (flurodinitrobenzene) sulfone or other bifunctional or multifunctional protein reagents. Preparation of the diazotized p-aminophenyldiethylphosphate into hemocyanin in Example 2.

EXAMPLE 2 a. Three moles of HCL and one mole of p-aminophenyldiethylphosphate were diazotized at 5° to 10° C. with a solution comprising 0.1 to 0.5 molar of sodium nitrite, to the starch iodine end point in the conventional procedure, producing the diazotized p-aminophenyldiethylphosphate. An excess of said diazotized p-aminophenyldiethylphosphate was added to a carrier of hemocyanin in the molar ratio of 4000:1 respectively forming a mixture which was allowed to stand and react at room temperature for approximately one hour buffered to a pH of 7.2 using 12.5 percent, weight/volume, of sodium carbonate producing the antigen of diazotized p-aminophenyldiethylphosphate-hemocyanin. The antigen was purified by gel filtration on dextran at 2° to 4° C. removing the impurities with 0.028 M sodium cacodylate as the eluting medium and recovering the antigen in the eluant; the filter medium being any dextran having a fractionation range of 100 to 5000 molecular weight, and exclusion limit of 5,000 molecular weight, and 2.5 ± 0.2 grams of water per gram of dry gel water regain.

b. The method in accordance with he procedure under (a) was repeated with the exception of substituting for the p-aminophenyl diethylphosphate a compound selected from the group consisting of 0(p-aminophenyl)-0'-pinacolyl methyl phosphate, p-aminobenzoic acid, glucosamine, glycylglycine, p-amino-m-nitrophenyl, and 0,0'-diethyl-0''-p-aminophenylthiophosphate and producing the antigen of diazotized compounds coupled into hemocyanin enumerated in Example 1(b).

Table 1 below describes the percent fluorescence of antibody population compared with varying concentrations of paraoxon utilizing the following buffered solutions of antibody and paraoxon. The antibody sample is $1.07 \times 10^{-6}$ M of lyophilized antibody in sodium phosphate buffer, pH 6.8, ionic strength 0.1 in sodium chloride. The antibody has an average molecular weight of 148,000 and was prepared in accordance with Example 1. The $1.07 \times 10^{-3}$ M nerve agent sample is prepared by dissolving 0.029 grams of diethyl p-nitrophenyl phosphate, paraoxon, in a final volume of 100 ml of sodium phosphate buffer, pH 6.8, containing 6 ml of isopropyl alcohol.

The fluorescence study was made on an Aminco-Bowman Spectrophotofluorometer at an excitation wavelength of 280 Spectrophotofluorometer $\mu$ and an emission wave length of 335 $\mu$ employing an 0.2 ml sample.

TABLE 1

Sample Sizes

| Volume (ml) of Antibody | Concentration $10^{-10}$ moles Antibody | Volume ($10^{-6}$ l) Paraoxon[1] | Concentration $10^{-9}$ moles Paraoxon[1] | Fluorescence (%) at 335 $\mu$ |
|---|---|---|---|---|
| 0.5 | 5.35 | Blank | Blank | 100 |
| 0.5 | 5.35 | 5 | 5.3 | 89 |
| 0.5 | 5.35 | 10 | 10.7 | 83 |
| 0.5 | 5.35 | 25 | 21.4 | 79 |
| 0.5 | 5.35 | 30 | 32.1 | 71 |
| 0.5 | 5.35 | 40 | 42.8 | 68 |
| 0.5 | 5.35 | 50 | 53.5 | 59 |
| 0.5 | 5.35 | 60 | 64.2 | 43.9 |
| 0.5 | 5.35 | 75 | 80.3 | 43.2[2] |
| 0.5 | 5.35 | 100 | 107.0 | 43.2[2] 131 |
| 0.5 | 5.35 | 125 | 133.8 | 36.9 |
| 0.5 | 5.35 | 150 | 160.5 | 36.9 |

[1]$LD_{50}$ is 350 mg/kg in mammals i.e. man.
[2]Ratio of Paraoxon to Antibody (a) $(80.3 \times 10^{-9})/(5.35 \times 10^{-10}) = 150$
(b) $(107.0 \times 10^{-9})/(5.35 \times 10^{-10}) = 200$
average Ratio = 175

The data from Table 1 was treated in accordance with the method of Stockell, A., *J. Bio. Chem.*, 234, 1286 (1959), which gave an estimation of the minimum number, 50, of sites involved in binding and an estimate of the average association constant per site of $10^{-5}$ M 1.

The data demonstrate that the interaction of a ligand, i.e., paraoxon, plus antibody takes place at the average mole ratio of 175 to 1, respectively. This ratio 175:1 is about 87 times greater than those reported for ligand and antibody interaction, i.e., 2 to 1, respectively, reported by Velick, S. F. et al., *Proc. Nat. Acad. Sci.*, U.S. 46, 1470 (1960). The mole ratio of 2 to 1 obtained using antibodies isolated by prior art methods, for example, Velick, supra, is insufficient to counteract the ligand. The publication data as compared with the data from Table 1, above, indicate that the mole proportion of antibody combining with 1/87 of the proportion of ligand would not give protection against one $LD_{50}$ (350 mg/kg in mammals, i.e., man). The heterogeneous antibody population of this invention now makes available a greater proportion of antibody to interact with greater quantities of ligand, i.e., 87 times the amount previously reported. The fluorescence data indicate the antibody fraction contains the entire spectrum of antibody population, that is, the combination of the poorer and stronger binding properties present in the original antiserum. The recoverable proportion of the antibody population by the prior art procedures makes available only the population with the poorer binding properties thus less effective in combining with ligand. The clinician has now available a more effective antibody population against multiple $LD_{50}$ levels of poisoner by harnessing the total population against a specific nerve agent.

We claim:

1. A method for isolating the total heterogeneous antibody population against antigens, the steps comprising adding an antigen to an immune serum comprising antibody to said antigen and thereby forming an immune precipitate in an aqueous medium, dissociating said precipitate by adding in combination an excess of a hapten or the antigen and a compound selected from the group consisting of acid, alkali and salt, neutralizing the aqueous medium thereby forming an insoluble antigen-antibody precipitate and a soluble complex of antibody with the hapten or the antigen, removing the insoluble antibody-antigen precipitate, separating the antibody from the soluble complex thereby recovering a heterogeneous antibody population against moieties of organophosphates, aromatic acids, sugars, small peptides or neutral antigenic determinants.

2. The method according to claim 1, wherein the acid is HCl and the liquid medium containing the dissociated precipitate is at pH 1 to 4.

3. The method according to claim 1, wherein the alkali is an alkaline metal hydroxide and the liquid medium containing the dissociated precipitate is at pH 11 to 13.

4. The method according to claim 1, wherein the salt is urea and the liquid medium is 5 molar to 7 molar in said salt.

5. The method according to claim 1, wherein the antigen added to the immune serum is selected from the group consisting of diazotized p-aminophenyl diethylphosphate coupled into hemocyanin, diazotized 0-(p-aminophenyl)-0'-pinacolyl methylphosphonate coupled into hemocyanin, diazotized p-aminobenzoic acid coupled into hemocyanin, diazotized glucosamine coupled into hemocyanin, diazotized glycylglycine coupled into hemocyanin, diazotized p-amino-m-nitrophenol coupled into hemocyanin, and diazotized 0,0'-diethyl-0''-p-aminophenylthiophosphate coupled into hemacyanin, the hapten is selected from the group consisting of p-aminophenyl diethylphosphate · HCl, 0-(p-aminophenyl)-0-pinacolyl methylphosphonate · HCl, p-aminobenzoic acid · HCl, glucosamine · HCl, glycylglycine · HCl, p-amino-m-nitrophenyl · HCl, and 0,0'-diethyl-0''p-aminophenylthiophosphate · HCl, an the moieties are selected from the group consisting of diethyl-p-nitrophenyl phosphate, o-pinacolyl methylfluorophosphate, benzoic acid, glucosamine, glycylglycine, dinitrophenol and 0,0'-diethyl-0''-p-nitrophenylthiophosphate.

6. The method according to claim 5, wherein the step of separating the soluble complex is gel filtration.

7. The method according to claim 5, wherein the step of separating the soluble complex is dialysis.

8. The method according to claim 7, wherein the antigen is diazotized p-aminophenyl diethylphosphate coupled into hemocyanin, the hapten is p-aminophenyl diethylphosphate · HCl and the moiety of organophosphate is diethyl-p-nitrophenyl phosphate.

9. The method according to claim 7, wherein the antigen is diazotized 0-(p-aminophenyl)-0'-pinacolyl methylphosphate coupled into hemocyanin, the hapten is 0-(p-aminophenyl)-0'-pinacolyl methylphosphate · HCl and the moiety of organophosphate is 0-pinacolyl methylfluorophosphate.

10. The method according to claim 7, wherein the antigen is diazotized 0,0'-diethyl-0''-p-aminophenylthiophosphate coupled into hemocyanin, the hapten is 0,0'-diethyl-0''-p-aminophenylthiophosphate · HCl, and the moiety of organophosphate is 0,0'-diethyl-0''-p-nitrophenylthiophosphate.

11. A total heterogeneous antibody population against a specific poisoner produced by adding an antigen to an immune serum comprising antibody to said antigen and forming an immune precipitate in an aqueous medium, dissociating said precipitate with excess hapten, adding to the aqueous medium comprising the dissociated precipitate a compound of acid, alkali or salt preventing reassociation of the dissociated precipitate and thereafter neutralizing the aqueous medium forming an insoluble antigen and soluble complex of antibody with hapten, centrifuging the neutralized aqueous medium and removing the insoluble antigen with the medium consisting essentially of the soluble complex, separating the antibody from the hapten by dialyzing the soluble complex in a semipermeable membrane against a physiologic buffer to the antibody and removing the aqueous medium consisting essentially of the heterogeneous antibody population from the interior of the membrane so obtained from dialysis.

* * * * *